United States Patent
Chen et al.

(10) Patent No.: US 8,330,908 B2
(45) Date of Patent: Dec. 11, 2012

(54) TRANSFLECTIVE DISPLAY AND FABRICATION METHOD THEREOF

(75) Inventors: Ying-Ru Chen, Hsinchu (TW); Tzu-Yuan Lin, Hsinchu (TW); Ching-Huan Lin, Hsinchu (TW); Chih-Ming Chang, Hsinchu (TW)

(73) Assignee: AU Optronics Corp., Hsin-Chu (TW)

( * ) Notice: Subject to any disclaimer, the term of this patent is extended or adjusted under 35 U.S.C. 154(b) by 1092 days.

(21) Appl. No.: 11/942,747

(22) Filed: Nov. 20, 2007

(65) Prior Publication Data
US 2008/0198309 A1    Aug. 21, 2008

(30) Foreign Application Priority Data
Feb. 16, 2007 (TW) .................... 96106098 A

(51) Int. Cl.
*G02F 1/1335* (2006.01)
(52) U.S. Cl. ........................................................ 349/114
(58) Field of Classification Search .................... 349/114
See application file for complete search history.

(56) References Cited

U.S. PATENT DOCUMENTS

| 7,167,223 | B2 | 1/2007 | Tanaka et al. | |
|---|---|---|---|---|
| 2001/0043297 | A1* | 11/2001 | Arai | 349/114 |
| 2004/0032549 | A1* | 2/2004 | Seki et al. | 349/106 |
| 2004/0212764 | A1* | 10/2004 | Tanaka et al. | 349/114 |
| 2006/0023146 | A1 | 2/2006 | Yang et al. | |
| 2006/0209232 | A1 | 9/2006 | Komitov et al. | |
| 2006/0244887 | A1 | 11/2006 | Lin et al. | |
| 2007/0091235 | A1 | 4/2007 | Tanaka et al. | |

FOREIGN PATENT DOCUMENTS

| CN | 1540400 A | 10/2004 |
|---|---|---|
| CN | 1544986 A | 11/2004 |
| TW | 200300036 | 6/1987 |

OTHER PUBLICATIONS

CN Office Action mailed Apr. 18, 2008.
Taiwanese language office action dated Jun. 7, 2011.
English language translation of abstract of TW 200300036, 2003.

* cited by examiner

*Primary Examiner* — Jerry Blevins
(74) *Attorney, Agent, or Firm* — McClure, Qualey & Rodack, LLP

(57) ABSTRACT

A transflective display. The transflective display includes a first substrate, a first electrode formed thereon, a second substrate having a reflective area and a transmissive area opposite to the first substrate, a second electrode formed on the second substrate opposite to the first electrode, and a liquid crystal layer including a plurality of liquid crystal molecules and polymers disposed between the first electrode and the second electrode. The invention also provides a method of fabricating the transflective display.

9 Claims, 4 Drawing Sheets

TRANSFLECTIVE DISPLAY AND FABRICATION METHOD THEREOF

BACKGROUND OF THE INVENTION

1. Field of the Invention

The invention relates to a liquid crystal display, and in particular to a transflective display.

2. Description of the Related Art

Liquid crystal display (LCD) is widely used in various electronic products such as portable personal computers, digital cameras, or projectors due to slimness and low power consumption.

Unlike conventional cathode ray tube (CRT) and electroluminescent (EL) displays, liquid crystal display panels are unilluminated. Currently, transmissive liquid crystal displays are popular. The backlight source of the display controls light transmission. However, the backlight source accounts for 50% or more of total power consumption, a problem where power conservation is important. Additionally, in brighter environments, the viewability of the transmissive liquid crystal display becomes limited.

Reflective liquid crystal displays suitable for use outdoors and in portable conditions utilize reflection of environmental light rather than a backlight source. Generally, the reflective liquid crystal display comprises twisted nematic (TN) and super twisted nematic (STN) modes.

However, when the environment is dark, viewability of the reflective liquid crystal display is limited.

To improve the display quality in bright environments, increased light intensity of a backlight source is required. Power consumption, however, is increased. Further, the display quality is reduced when directly exposed under sunlight or other light sources, or when the liquid crystal display screen receives sunlight or a light source, surrounding images are reflected.

To improve the problem, the transmissive and reflective liquid crystal displays are combined in a transflective liquid crystal display.

In liquid crystal alignment, the multi-domain vertical alignment (MVA) is used in conventional transflective liquid crystal display. The protrusions disposed on reflective area control the pretilt angles of the liquid crystal molecules. However, such technique is complex, affecting transmissive contrast, aspect ratio, and response speed.

BRIEF SUMMARY OF THE INVENTION

The invention provides a transflective display comprising a first substrate, a first electrode formed thereon, a second substrate having a reflective area and a transmissive area opposite to the first substrate, a second electrode formed on the second substrate opposite to the first electrode, and a liquid crystal layer comprising a plurality of liquid crystal molecules and polymers disposed between the first electrode and the second electrode.

The invention also provides a method of fabricating a transflective display, in which a first substrate is provided. A first electrode is formed on the first substrate. A second substrate having a reflective area and a transmissive area is provided, opposite to the first substrate. A second electrode having a plurality of slits is formed on the second substrate, opposite to the first electrode. A liquid crystal layer comprising a plurality of liquid crystal molecules and monomers is disposed between the first electrode and the second electrode.

The transflective display with polymer stabilized alignment (PSA) and multi-domain vertical alignment (MVA) improves transmissive contrast, aspect ratio, and response speed.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawing, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
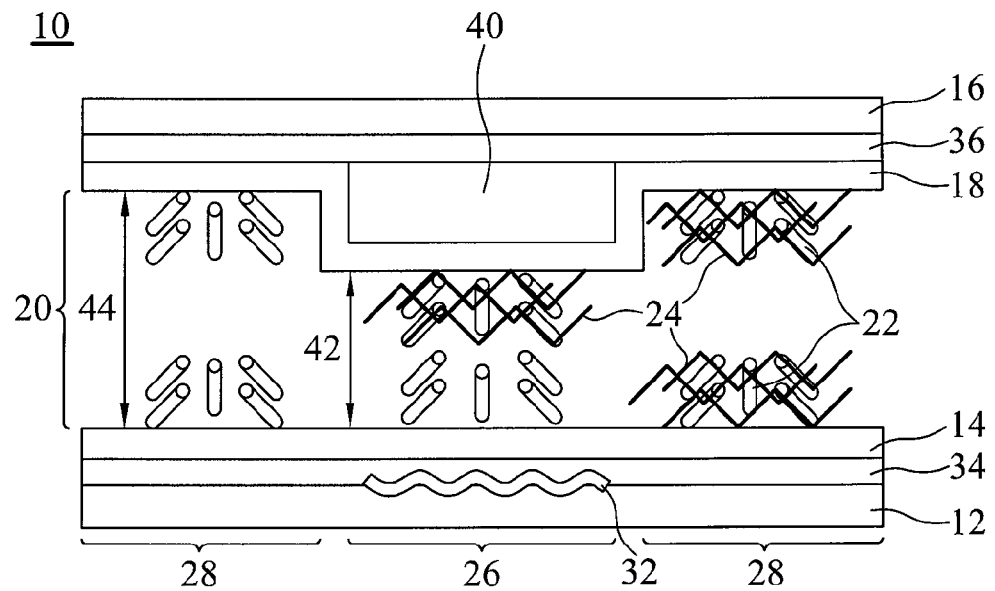
FIG. 1 shows a transflective display comprising polymers in an embodiment of the invention.

In an embodiment, a transflective display is shown in FIG. 1. The transflective display 10 comprises a first substrate 16, a first electrode 18, a second substrate 12, a second electrode 14, and a liquid crystal layer 20 comprising a plurality of liquid crystal molecules 22 and polymers 24.

The second substrate 12 has a reflective area 26 and a transmissive area 28. The second electrode 14 is formed on the second substrate 12. The first substrate 16 is opposite to the second substrate 12. The first electrode 18 is formed on the first substrate 16, opposite to the second electrode 14. The liquid crystal layer 20 is disposed between the first electrode 18 and the second electrode 14.

Figure 2:
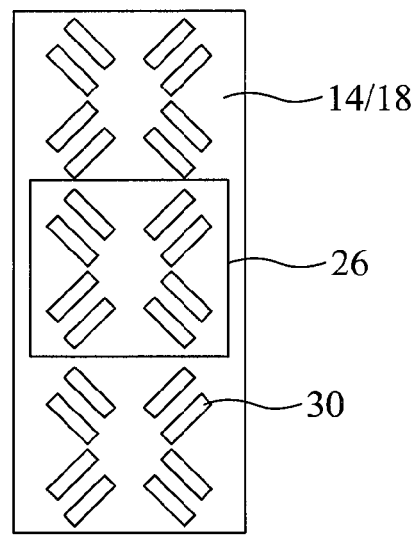
FIG. 2 shows an electrode structure of a transflective display in an embodiment of the invention.

The second electrode 14 or the first electrode 18 may have a plurality of slits 30 (as shown in FIG. 2) to align the liquid crystal molecules 22. The transflective display 10 further comprises a reflective layer 32 disposed on the reflective area 26 of the second substrate 12. The reflective layer 32 may be any material with high reflectivity such as aluminum. The transflective display 10 further comprises an insulation layer 34 formed between the reflective layer 32 and the second electrode 14.

Figure 3:
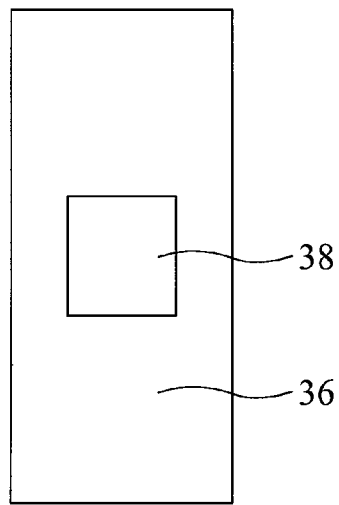
FIG. 3 shows a color filter structure of a transflective display in an embodiment of the invention.

The transflective display 10 further comprises a color filter 36 formed between the first substrate 16 and the first electrode 18. Generally, the color filter 36 corresponding to the reflective area 26 may have a hole 38 (as shown in FIG. 3) to increase light transmission. The transflective display 10 further comprises a dielectric layer 40 formed between the color filter 36 and the first electrode 18 corresponding to the reflective area 26.

Most of the polymers 24 formed in the liquid crystal layer 20 are adjacent to the first electrode 18 and the second electrode 14 to effectively control the pretilt angles of the liquid crystal molecules 22. Additionally, the liquid crystal layer 20 has different heights, for example, the liquid crystal layer 20 corresponding to the reflective area 26 has a first height 42 and the liquid crystal layer 20 corresponding to the transmissive area 28 has a second height 44. The second height 44 may be 1.5 to 2.5 times the first height 42.

Figure 4:
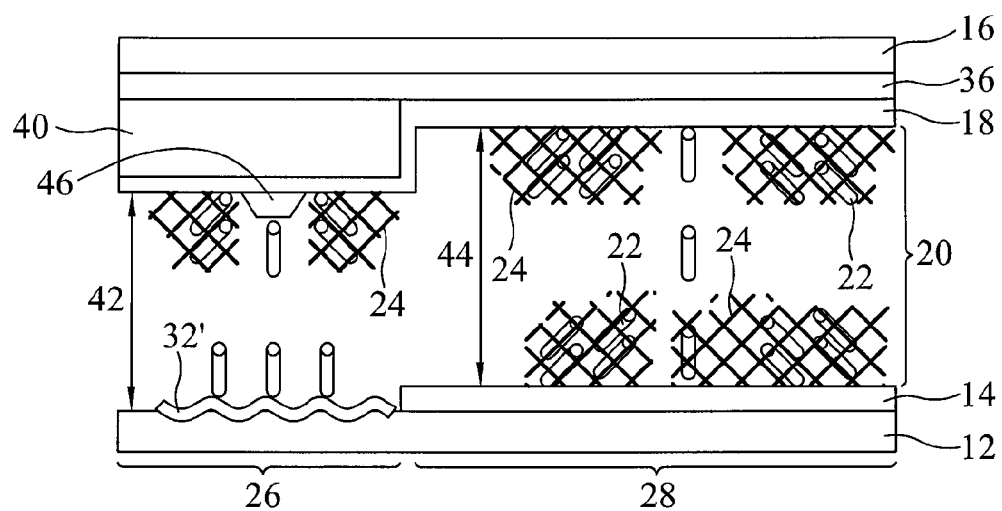
FIG. 4 shows a transflective display comprising polymers in an embodiment of the invention.

In another embodiment, a transflective display is shown in FIG. 4. The transflective display 10 comprises a first substrate 16, a first electrode 18, a second substrate 12, a second electrode 14, and a liquid crystal layer 20 comprising a plurality of liquid crystal molecules 22 and polymers 24.

The second substrate 12 has a reflective area 26 and a transmissive area 28. The second electrode 14 is formed on the second substrate 12. The first substrate 16 is opposite to the second substrate 12. The first electrode 18 is formed on the first substrate 16, opposite to the second electrode 14. The liquid crystal layer 20 is disposed between the first electrode 18 and the second electrode 14.

Figure 5:
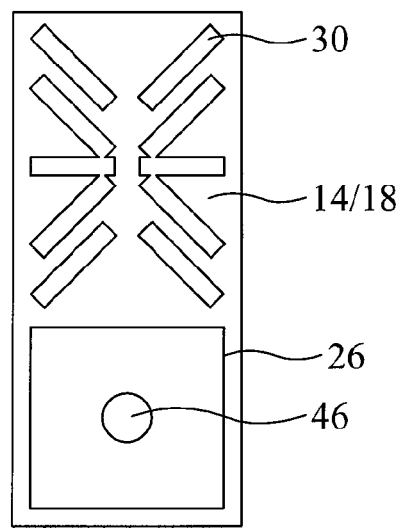
FIG. 5 shows an electrode structure of a transflective display in an embodiment of the invention.

The second electrode 14 or the first electrode 18 may have a plurality of slits 30 (as shown in FIG. 5) to align the liquid crystal molecules 22. A protrusion 46 disposed on the first electrode 18 corresponding to the reflective area 26 is also used to align the liquid crystal molecules 22 (as shown in FIG. 5). The transflective display 10 further comprises a reflective electrode 32' disposed on the reflective area 26 of the second substrate 12. The reflective electrode 32' may be any material with a high reflectivity such as aluminum.

The transflective display 10 further comprises a color filter 36 formed between the first substrate 16 and the first electrode 18. Generally, the color filter 36 corresponding to the reflective area 26 may have a hole 38 to increase light transmission. The transflective display 10 further comprises a dielectric layer 40 formed between the color filter 36 and the first electrode 18 corresponding to the reflective area 26.

Most polymers 24 formed in the liquid crystal layer 20 are adjacent to the first electrode 18 and the second electrode 14 to effectively control the pretilt angles of the liquid crystal molecules 22. Additionally, the liquid crystal layer 20 has different heights, for example, the liquid crystal layer 20 corresponding to the reflective area 26 has a first height 42 and the liquid crystal layer 20 corresponding to the transmissive area 28 has a second height 44. The second height 44 may be 1.5 to 2.5 times the first height 42.

Figure 6:
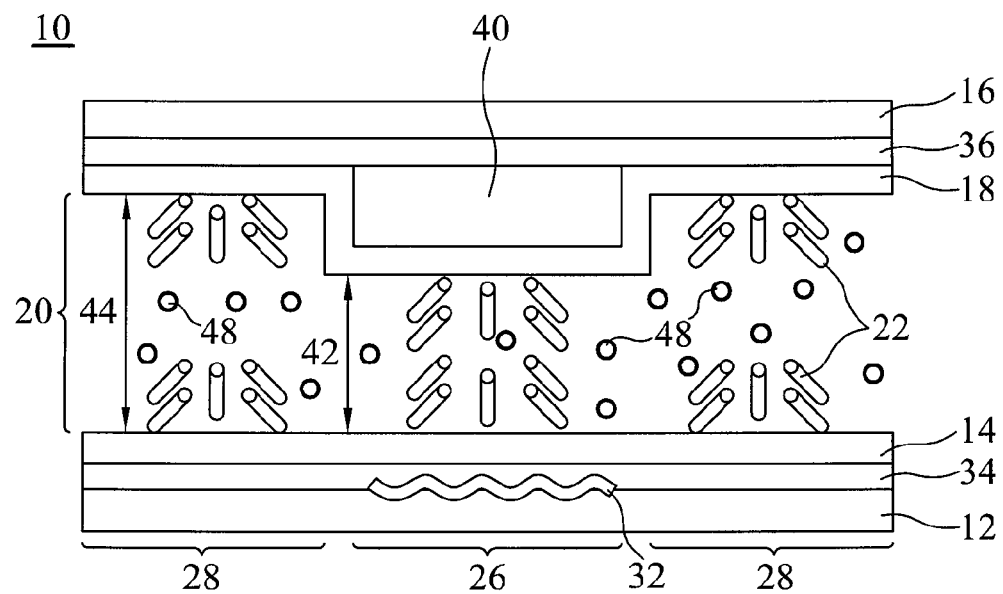
FIG. 6 shows a transflective display comprising monomers in an embodiment of the invention.

An embodiment of a method of fabricating a transflective display is shown in FIG. 6. A first substrate 16 and a second substrate 12 having a reflective area 26 and a transmissive area 28 are provided. The first substrate 16 is opposite to the second substrate 12. A color filter 36 is then formed on the first substrate 16. Next, a dielectric layer 40 is formed on the color filter 36 corresponding to the reflective area 26 of the second substrate 12. A first electrode 18 is then formed on the dielectric layer 40 and the color filter 36.

A reflective layer 32 is formed on the reflective area 26 of the second substrate 12. An insulation layer 34 is then formed on the reflective layer 32 and the second substrate 12. Next, a second electrode 14 is formed on the insulation layer 34. The second electrode 14 is opposite to the first electrode 18. The first and second electrodes may have a plurality of slits 30 (as shown in FIG. 2).

A liquid crystal layer 20 comprising a plurality of liquid crystal molecules 22 and monomers 48 is disposed between the first electrode 18 and the second electrode 14. The monomers 48 have a weight ratio of about 0.11 to 20%, also 0.1 to 5%.

Next, the monomers 48 are polymerized by irradiation such as ultraviolet or heating to form a plurality of polymers 24 (as shown in FIG. 1). The polymers 24 are adjacent to the first electrode 18 and the second electrode 14.

A hole 38 (as shown in FIG. 3) may be created in the color filter 36 corresponding to the reflective area 26 to increase light transmission, facilitating the polymerization of the monomers 48 corresponding to the reflective area 26 during ultraviolet irradiation.

Figure 7:
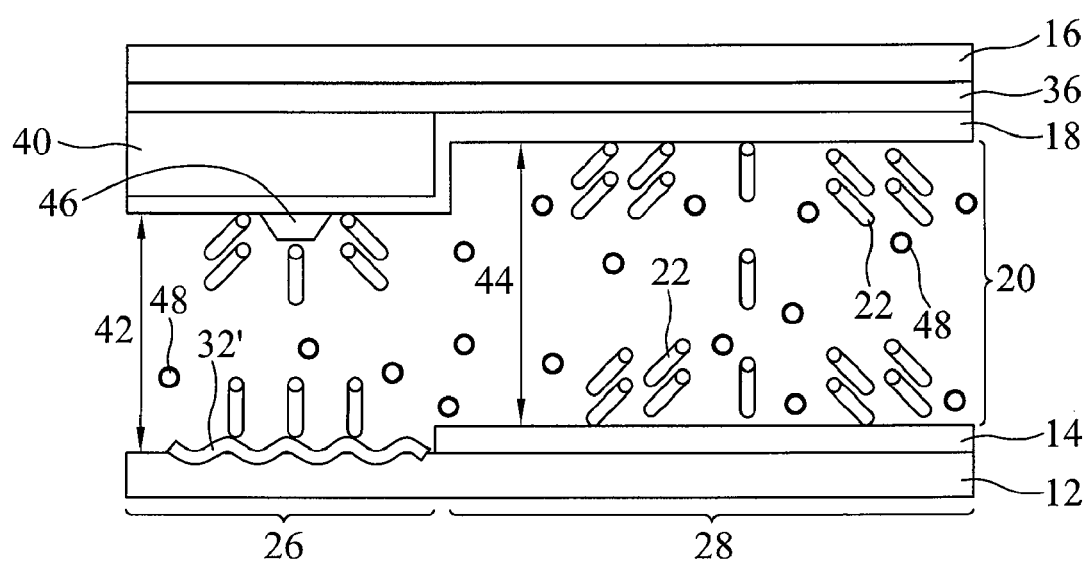
FIG. 7 shows a transflective display comprising monomers in an embodiment of the invention.

Another embodiment of a method of fabricating a transflective display is shown in FIG. 7. A first substrate 16 and a second substrate 12 having a reflective area 26 and a transmissive area 28 are provided. The first substrate 16 is opposite to the second substrate 12. A color filter 36 is then formed on the first substrate 16. Next, a dielectric layer 40 is formed on the color filter 36 corresponding to the reflective area 26 of the second substrate 12. A first electrode 18 is then formed on the dielectric layer 40 and the color filter 36.

A reflective electrode 32' is formed on the reflective area 26 of the second substrate 12. Next, a second electrode 14 is formed on the second substrate 12. The second electrode 14 is opposite to the first electrode 18. The first and second electrodes may have a plurality of slits 30 (as shown in FIG. 2).

A liquid crystal layer 20 comprising a plurality of liquid crystal molecules 22 and monomers 48 is disposed between the first electrode 18 and the second electrode 14. The monomers 48 have a weight ratio of about 0.1 to 20%, also 0.1 to 5%.

A protrusion 46 is further formed on the first electrode 18 corresponding to the reflective area 26 to align the liquid crystal molecules 22.

Next, the monomers 48 are polymerized by irradiation such as ultraviolet or heating to form a plurality of polymers 24 (as shown in FIG. 4). The polymers 24 are adjacent to the first electrode 18 and the second electrode 14.

A hole 38 (as shown in FIG. 3) may be created in the color filter 36 corresponding to the reflective area 26 to increase light transmission, facilitating the polymerization of the monomers 48 corresponding to the reflective area 26 during ultraviolet irradiation.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A transflective display, comprising:
a first substrate;
a first electrode formed thereon;
a second substrate having a reflective area and a transmissive area opposite to the first substrate;
a second electrode formed on the second substrate opposite to the first electrode; and
a liquid crystal layer comprising a plurality of liquid crystal molecules and non-liquid crystal polymers disposed between the first electrode and the second electrode.

2. The transflective display as claimed in claim 1, wherein the second electrode comprises a plurality of slits.

3. The transflective display as claimed in claim 1, further comprising a protrusion disposed on the first electrode corresponding to the reflective area.

4. The transflective display as claimed in claim 1, further comprising a reflective electrode disposed on the reflective area of the second substrate.

5. The transflective display as claimed in claim 1, further comprising a reflective layer formed on the reflective area of the second substrate and an insulation layer formed between the reflective layer and the second electrode.

6. The transflective display as claimed in claim 1, further comprising a color filter formed between the first substrate and the first electrode.

7. The transflective display as claimed in claim 6, wherein the color filter corresponding to the reflective area comprises a hole.

8. The transflective display as claimed in claim 1, wherein the polymers are adjacent to the first electrode and the second electrode.

9. The transflective display as claimed in claim 1, wherein the liquid crystal layer corresponding to the reflective area has a first height and the liquid crystal layer corresponding to the transmissive area has a second height, wherein the second height is 1.5 to 2.5 times the first height.

\* \* \* \* \*